United States Patent
Abe

(10) Patent No.: US 11,787,308 B2
(45) Date of Patent: Oct. 17, 2023

(54) BATTERY TEMPERATURE CONTROL DEVICE OF ELECTRIC VEHICLE

(71) Applicant: Honda Motor Co., Ltd., Tokyo (JP)

(72) Inventor: Hajime Abe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 411 days.

(21) Appl. No.: 17/153,847

(22) Filed: Jan. 20, 2021

(65) Prior Publication Data

US 2021/0221254 A1 Jul. 22, 2021

(30) Foreign Application Priority Data

Jan. 21, 2020 (JP) ................................. 2020-007704

(51) Int. Cl.
*B60L 58/26* (2019.01)
*B60L 55/00* (2019.01)
(Continued)

(52) U.S. Cl.
CPC ............... *B60L 58/26* (2019.02); *B60L 53/20* (2019.02); *B60L 55/00* (2019.02); *B60L 58/27* (2019.02); *B60L 2240/545* (2013.01)

(58) Field of Classification Search
CPC .......... B60L 58/10; B60L 58/24; B60L 58/25; B60L 58/26; B60L 58/28; B60L 53/20; B60L 53/22; B60L 55/00; B60L 2240/52; B60L 2240/525; B60L 2240/54; B60L 2240/545; B60H 1/005; B60H 1/32;
(Continued)

(56) References Cited

U.S. PATENT DOCUMENTS 10,916,945 B2    2/2021   Kudo
2014/0311704 A1*  10/2014  Yokoyama ............. B60L 58/26
                                                          165/41

(Continued)

FOREIGN PATENT DOCUMENTS

JP    2013093991    5/2013
JP    2013188098    9/2013
(Continued)

OTHER PUBLICATIONS

"Office Action of Japan Counterpart Application", dated Aug. 1, 2023, with English translation thereof, p. 1-p. 12.

*Primary Examiner* — Russell Frejd
*Assistant Examiner* — Sara J Lewandroski
(74) *Attorney, Agent, or Firm* — JCIPRNET

(57) ABSTRACT

The disclosure provides a battery temperature control device of an electric vehicle capable of efficiently heating a battery for vehicle driving while executing V2G in a low temperature environment. A battery temperature control device of an electric vehicle controls the temperature of a battery of the electric vehicle, and the electric vehicle participates in V2G which allows bidirectional power exchange between the battery for vehicle driving mounted on the electric vehicle and a power system. When an aggregator on the power system side starts execution of V2G by transmitting to an ECU a start instruction for the charge and discharge of the battery, the ECU controls a four-way valve to connect a battery cooling circuit and a charger cooling circuit when a battery temperature is less than a predetermined temperature.

16 Claims, 7 Drawing Sheets

(51) Int. Cl.
  *B60L 53/20* (2019.01)
  *B60L 58/27* (2019.01)
(58) Field of Classification Search
  CPC ... B60H 2001/3269; F25B 45/00; G06F 1/20; G06F 1/206
  See application file for complete search history.

(56) References Cited

U.S. PATENT DOCUMENTS

2017/0305293 A1* 10/2017 Takizawa ................ B60L 53/00
2019/0214693 A1   7/2019 Iida et al.
2020/0164718 A1*  5/2020 Takei .................... B60L 3/0061

FOREIGN PATENT DOCUMENTS

| JP | 2014100928 | 6/2014 |
| JP | 2015063174 | 4/2015 |
| JP | 2016135651 | 7/2016 |
| JP | 2018152201 | 9/2018 |
| JP | 2018161056 | 10/2018 |
| JP | 2019023059 | 2/2019 |
| JP | 2019122174 | 7/2019 |

\* cited by examiner

BATTERY TEMPERATURE CONTROL DEVICE OF ELECTRIC VEHICLE

CROSS-REFERENCE TO RELATED APPLICATION

This application claims the priority benefit of Japan application serial no. 2020-007704, filed on Jan. 21, 2020. The entirety of the above-mentioned patent application is hereby incorporated by reference herein and made a part of this specification.

BACKGROUND

Technical Field

The disclosure relates to a battery temperature control device of an electric vehicle participating in vehicle to grid (V2G) which allows bidirectional power exchange between a battery for vehicle driving mounted on the electric vehicle and the power system.

Description of Related Art

In recent years, when an electric vehicle equipped with a battery for vehicle driving (such as an electric automobile or a plug-in hybrid vehicle) is not used as a means of transportation, not only is it connected to a power system having a commercial power grid to charge the battery, but practical use of V2G which supplies the power stored in the battery to the power system is also being promoted. In such V2G, the battery of the electric vehicle connected to the power system functions as a coordinator of the power supply and demand. That is, in the power system, when the amount of power generation is excessively large with respect to the demand, the battery of the electric vehicle is charged, and conversely, when the amount of power generation is small, the battery is discharged to supply the power system. In this way, it is possible to maintain the balance between the supply and demand of power in the power system.

The electric vehicle participating in V2G as described above is provided with a power converter which converts power between an AC voltage on the power system side and a DC voltage on the battery side of the electric vehicle. With this power converter, the AC voltage on the power system side is converted to a DC voltage when the battery is charged, and the DC voltage on the battery side is converted to an AC voltage when power is supplied to the power system by discharging the battery.

Each of the battery and the power converter described above generates heat when the battery is charged and discharged, and if the temperature of the battery and the power converter becomes too high, proper charge and discharge may not be possible. Further, in a low temperature environment, if the temperature of the battery becomes too low, proper charge and discharge may not be possible. Therefore, it is preferable to maintain the battery in a proper temperature range, and for example, what is disclosed in Patent Document 1 is known as such a battery temperature control device.

The battery temperature control device of Patent Document 1 includes a temperature adjustment circuit for circulating a refrigerant such as cooling water, and a battery is connected to this temperature adjustment circuit, and a bidirectional charger is also connected as the power converter described above. Then, the temperature of the battery is adjusted to a predetermined temperature range by lowering the temperature of the high-temperature battery or raising the temperature of the low-temperature battery by circulating the refrigerant in the temperature adjustment circuit.

RELATED ART

Patent Document

[Patent Document 1] Japanese Laid-open No. 2018-152201

However, when an electric vehicle equipped with the above-mentioned battery temperature control device participates in V2G, for example, when the electric vehicle is in a low temperature environment and the temperature of the battery is less than the predetermined temperature range, it may not be possible to properly respond to the charge and discharge request from the power system side. In general, the above-mentioned battery has an output limit value at the time of charge and discharge depending on the temperature of the battery itself due to its characteristics. Therefore, during the charge or discharge of the battery according to the request from the power system side (hereinafter referred to as "execution of V2G"), if the charge and discharge is performed according to the request that exceeds the output limit value of the battery, the battery may malfunction. In order to avoid such a malfunction, in the above-mentioned conventional battery temperature control device, the temperature rise control for raising the temperature of the battery is performed before the start of the execution of V2G. That is, when the temperature of the battery is less than the lower limit of the predetermined temperature range, V2G cannot be executed, and the execution of V2G is started after waiting for the temperature rise of the battery.

Further, as described above, as the battery is charged and discharged, in addition to the battery, the bidirectional charger also generates heat. Therefore, in the above-mentioned battery temperature control device, it is possible to transfer the heat energy of the bidirectional charger to the battery via the refrigerant circulating in the temperature adjustment circuit to raise the temperature of the battery. However, since the temperature controlled for proper operation differs between the battery and the bidirectional charger, in the temperature adjustment circuit configured by a single loop, it may not be possible to efficiently adjust the temperature of the battery and the bidirectional charger.

The disclosure has been made to solve the above problems and provides a battery temperature control device of an electric vehicle capable of efficiently heating a battery for vehicle driving while executing V2G in a low temperature environment.

SUMMARY

In view of the above, an embodiment of the disclosure provides a battery temperature control device of an electric vehicle for controlling the temperature (in the embodiment and also in the following description referred to as the battery temperature TB) of a battery of the electric vehicle, and the electric vehicle participates in vehicle to grid (V2G) which allows bidirectional power exchange between the battery 21 for vehicle driving mounted on the electric vehicle 3 and a power system 2. The battery temperature control device includes: a battery cooling circuit 50 for cooling or heating the battery by circulating a refrigerant; a power converter cooling circuit (the charger cooling circuit 60) for cooling a power converter (the bidirectional charger 22) which converts power between the battery and the power system by circulating a refrigerant; a cooling circuit connection part (the four-way valve 54) which is capable of connecting the battery cooling circuit and the power converter cooling circuit; a battery temperature detection part (the battery temperature 71) which detects the temperature of the battery; a vehicle side control part (the ECU 20) which is provided in the electric vehicle, which controls the cooling circuit connection part and charge and discharge of the battery, and which is capable of transmitting and receiving information about the battery; and a power system side battery charge and discharge management part (the aggregator 7) which is provided in the power system, which is configured to be capable of transmitting and receiving information about the battery to and from the vehicle side control part, and which manages the charge and discharge of the battery. When the power system side battery charge and discharge management part starts execution of V2G by transmitting to the vehicle side control part a start instruction for the charge and discharge of the battery, the vehicle side control part controls the cooling circuit connection part to connect the battery cooling circuit and the power converter cooling circuit when the detected temperature of the battery is less than a predetermined temperature TBREF (TB<TBREF).

DESCRIPTION OF THE EMBODIMENTS

Figure 1:
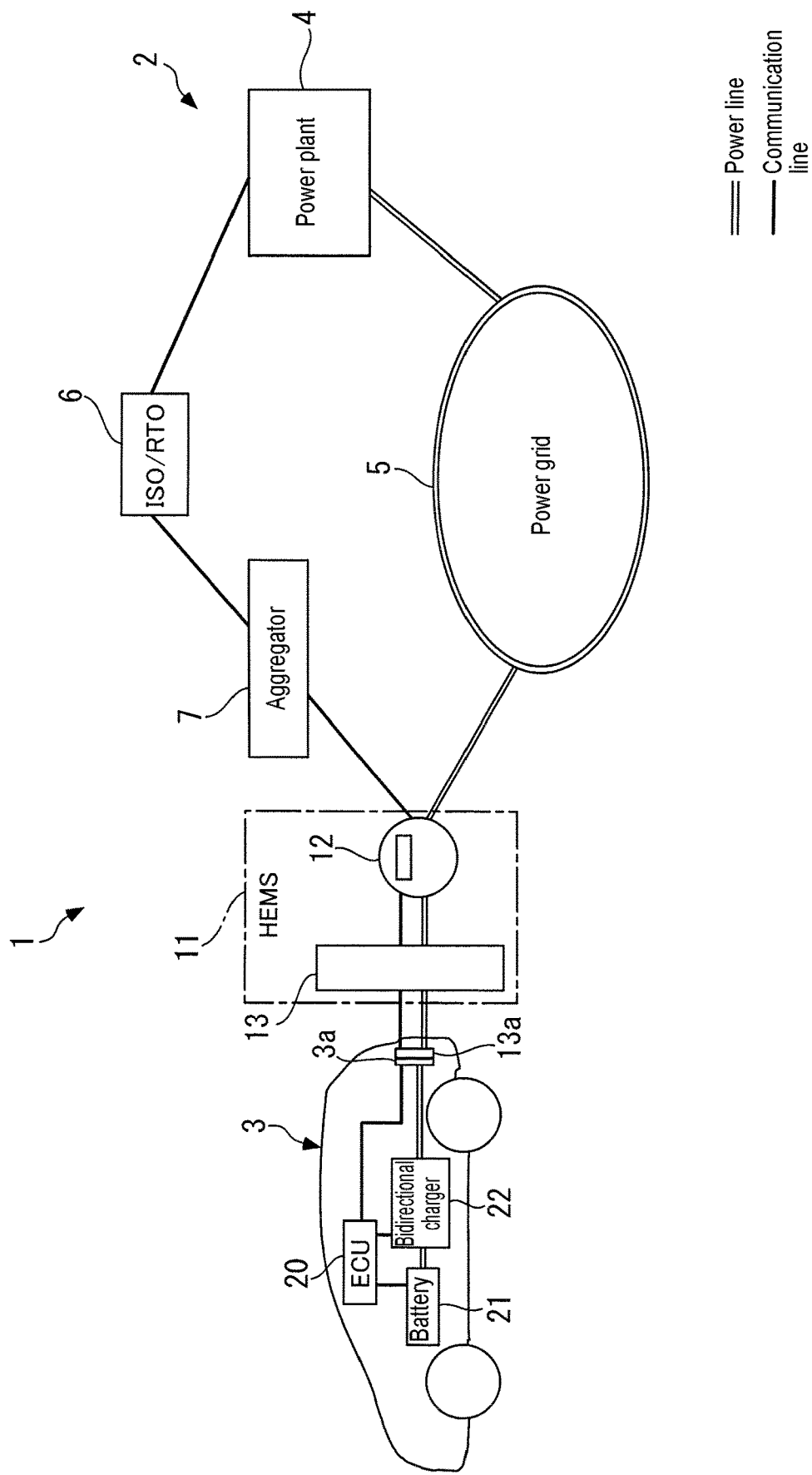
FIG. 1 is a diagram schematically showing an overall configuration of a V2G system.

According to this configuration, the electric vehicle participating in V2G is equipped with the battery for vehicle driving and the above-mentioned power converter. Further, the above-mentioned electric vehicle is provided with the battery cooling circuit which cools the battery and the power converter cooling circuit which cools the power converter, and the cooling circuits are connectable by the cooling circuit connection part. The power system side battery charge and discharge management part provided in the power system starts execution of V2G by transmitting to the vehicle side control part a start instruction for the charge and discharge of the battery. In this case, when the electric vehicle is in a low temperature environment and the battery temperature is less than the predetermined temperature, the cooling circuit connection part is controlled by the vehicle side control part to connect the battery cooling circuit and the power converter cooling circuit.

The temperature at which the power converter is controlled to operate properly is usually greater than that of the battery. Therefore, the temperature of the refrigerant circulating in the power converter cooling circuit is greater than the temperature of the refrigerant circulating in the battery cooling circuit, and by connecting these two cooling circuits, the high-temperature refrigerant flowing through the power converter cooling circuit can flow into the battery cooling circuit. In addition, the temperature of the battery and the power converter rises when the execution of V2G is started. In this case, since the refrigerant flowing through the power converter cooling circuit flows into the battery cooling circuit, the temperature of the battery can be raised more efficiently than in the case where the temperature of the battery is raised only by the heat generated by the battery. As described above, according to the disclosure, it is possible to efficiently heat the battery for vehicle driving while executing V2G in a low temperature environment.

According to an embodiment of the disclosure, in the above-mentioned battery temperature control device of the electric vehicle, when the detected temperature of the battery is less than the predetermined temperature, the vehicle side control part transmits to the power system side battery charge and discharge management part a heating request indicating that the battery is in a state to be heated and transmits an output limit value (the charge limit CHLMT and the discharge limit DCLMT) at the time of the charge and discharge of the battery, and when receiving the heating request, the power system side battery charge and discharge management part issues to the vehicle side control part an output request for the battery to charge and discharge according to the received output limit value without exceeding the output limit value.

According to this configuration, when the temperature of the battery is less than the predetermined temperature, the vehicle side control part transmits the heating request and the output limit value of the battery to the power system side battery charge and discharge management part. Further, the output limit value of the battery is defined according to the temperature of the battery and the like, and is the limit power value at the time of the charge and discharge of the battery, respectively. In addition, when receiving the heating request, the power system side battery charge and discharge management part issues to the vehicle side control part the output request for the battery to charge and discharge according to the received output limit value without exceeding the output limit value. As a result, the charge and discharge of the battery by V2G is performed without exceeding the output limit value of the battery, and therefore, even when the battery temperature is less than the predetermined temperature, V2G can be stably executed.

According to an embodiment of the disclosure, in the above-mentioned battery temperature control device of the electric vehicle, the vehicle side control part transmits to the power system side battery charge and discharge management part a predetermined output profile for the battery, and the power system side battery charge and discharge management part issues to the vehicle side control part an output request for the battery to charge and discharge according to the received output profile.

According to this configuration, the vehicle side control part transmits to the power system side battery charge and discharge management part a predetermined output profile for the battery. This output profile is data such as the charge and discharge waveform data that can be output by charge and discharge, the charge and discharge duty ratio and the like in the current state of the battery. Then, the power system side battery charge and discharge management part issues to the vehicle side control part an output request for the battery to charge and discharge according to the received output profile. In this way, it is possible to execute V2G according to the request of the vehicle side.

According to an embodiment of the disclosure, in the above-mentioned battery temperature control device of the electric vehicle, the vehicle side control part controls the cooling circuit connection part to disconnect the battery cooling circuit and the power converter cooling circuit when the detected temperature of the battery is greater than or equal to the predetermined temperature.

According to this configuration, when the battery temperature is greater than or equal to the predetermined temperature, the cooling circuit connection part is controlled by the vehicle side control part to disconnect the battery cooling circuit and the power converter cooling circuit. As a result, after that, the battery cooling circuit and the power converter cooling circuit become independent cooling circuits, and the battery and the power converter can be cooled in a temperature range suitable for each.

According to an embodiment of the disclosure, in the above-mentioned battery temperature control device of the electric vehicle, the cooling circuit connection part includes a four-way valve having four ports through which the refrigerant is capable of flowing in and out and configured to allow any two of the four ports to communicate with each other, and the battery cooling circuit is connected to two of the four ports, and the power converter cooling circuit is connected to the other two ports.

According to this configuration, the cooling circuit connection part includes the above-mentioned four-way valve, and the battery cooling circuit is connected to two of the four ports of the four-way valve, and the power converter cooling circuit is connected to the other two ports. When the two ports connected to the battery cooling circuit are communicated with each other and the two ports connected to the power converter cooling circuit are communicated with each other, the battery cooling circuit and the power converter cooling circuit become independent cooling circuits. On the other hand, when one of the two ports connected to the battery cooling circuit and one of the two ports connected to the power converter cooling circuit are communicated, it becomes a cooling circuit in which the battery cooling circuit and the power converter cooling circuit are connected. As described above, by adopting the above-mentioned four-way valve as the cooling circuit connection part, the connection and disconnection of the battery cooling circuit and the power converter cooling circuit can be easily performed.

Hereinafter, exemplary embodiments of the disclosure will be described in detail with reference to the drawings. FIG. 1 schematically shows an overall configuration of a V2G system. This V2G system 1 is a system for exchanging power between a power system 2 including a commercial power grid and multiple electric vehicles 3 (only one electric vehicle is shown in FIG. 1), and when the electric vehicle 3 is not used as a means of transportation, a battery 21 for vehicle driving mounted on the electric vehicle 3 is used as a power storage facility. Therefore, bidirectional power exchange is allowed between the battery 21 of the electric vehicle 3 participating in V2G and the power system 2.

As shown in FIG. 1, the V2G system 1 includes the power system 2 having a power plant 4 and a power grid 5. At the power plant 4, power is generated by energy such as thermal power, hydraulic power, nuclear power, wind power, or solar power. The power grid 5 includes a power transmission network and a power distribution network, and sends the power generated by the power plant 4 to the power consumer side. Further, in the power system 2, a system operating organization 6—referred to as the "ISO/RTO" (Independent System Operator/Regional Transmission Organization) in FIG. 1—which manages the power transmission network and an aggregator 7 which manages the charge and discharge of the battery 21 of the electric vehicle 3 participating in V2G are connected to each other and connected to the power plant 4 and an HEMS 11 (to be described later) via a communication line.

The electric vehicle 3 is connected to the power system 2 described above via the home energy management system (HEMS) 11. The above-mentioned HEMS 11 is a system disposed in a general household or the like and manages electric energy in the household, and various electric appliances used in the household are connected via a communication line. In addition, FIG. 1 shows only a smart meter 12 and a charging stand 13. By connecting a connector 13a at the tip of the cable extending from the charging stand 13 to an inlet 3a of the electric vehicle 3, the electric vehicle 3 is connected to the power grid 5 of the power system 2 via a power line, and is connected to the aggregator 7 of the power system 2 via a communication line. The aggregator 7 is a device which manages the charge and discharge of batteries 21 of multiple electric vehicles (not shown) including the electric vehicle 3, and is designed to respond to requests of the electric power company which operates the power plant 4 and the system operating organization 6 which manages the power transmission network by transmitting and receiving predetermined data and instructions to and from the electric vehicle 3.

Further, the electric vehicle 3 is a plug-in hybrid vehicle equipped with an engine (not shown) as a drive source in addition to the battery 21. The engine is, for example, an in-line four-cylinder gasoline engine, and the battery 21 is configured by, for example, a lithium ion battery. Further, the electric vehicle 3 is provided with a bidirectional charger 22 (the power converter) which converts power between an AC voltage and a DC voltage. Specifically, the bidirectional charger 22 converts the AC voltage from the power system 2 to a DC voltage when the battery 21 is charged, and converts the DC voltage from the battery 21 to an AC voltage when power is supplied to the power system 2 by discharging the battery 21.

Figure 2:
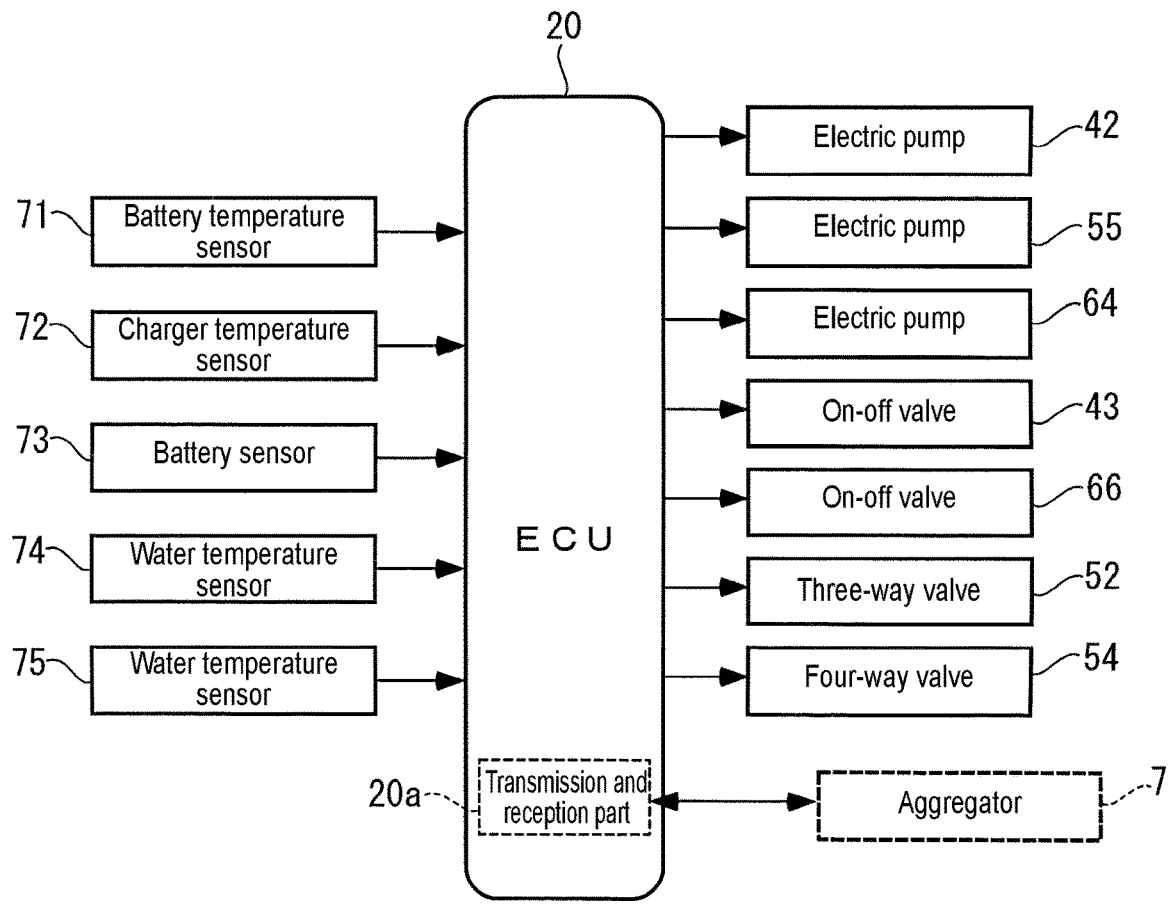
FIG. 2 is a block diagram showing a battery temperature control device with an ECU of an electric vehicle as the center.

Further, the electric vehicle 3 is provided with an electronic control unit (ECU) 20 which controls various machines inside the electric vehicle 3. As shown in FIG. 2, the ECU 20 (the vehicle side control part) controls a cooling device 31 (to be described later) in the electric vehicle 3 in response to input signals from various sensors 71 to 75 (to be described later). Further, the ECU 20 has a transmission and reception part 20a, and is capable of transmitting and receiving information about the battery 21 and the like to and from the aggregator 7 of the power system 2.

Here, data transmitted and received between the electric vehicle 3 and the power system 2 will be described with reference to FIG. 3. When communication is established between the ECU 20 of the electric vehicle 3 and the aggregator 7 of the power system 2, the ECU 20 of the electric vehicle 3 transmits the following data a to d as information about the battery 21 to the aggregator 7.

a. State of charge
b. Battery output (charge/discharge) limit value
c. State of charge limit value
d. Charge completion time The data a is the current state of charge (SOC) of the battery 21 in the electric vehicle 3. The data b is the output limit value of the battery 21, specifically, a chargeable limit power value at the time of charge and a dischargeable limit power value at the time of discharge. The data c is the SOC limit value, specifically, an upper limit value and a lower limit value of the SOC allowed for the battery 21 during the execution of V2G. Further, the data d is set by the user of the electric vehicle 3 and is a time when the battery 21 should be fully charged.

Further, when the temperature of the battery 21 of the electric vehicle 3 is less than a predetermined temperature, the following data e and f are also transmitted from the ECU 20 to the aggregator 7.

e. Battery heating request
f. Battery request output profile

The data e notifies that the temperature of the battery 21 is low and the battery 21 is in a state to be heated. Further, the data f is an output profile requested by the electric vehicle 3 side when the charge and discharge of the battery 21 are executed. This output profile is data such as the charge and discharge waveform data that can be output by charge and discharge, the charge and discharge duty ratio and the like in the current state of the battery 21. Further, the data f can be transmitted not only when the temperature of the battery 21 is less than the predetermined temperature but also when the temperature is greater than or equal to the predetermined temperature.

In addition, the following data α and β are transmitted from the aggregator 7 to the ECU 20 of the electric vehicle 3.

α. Start/end of the execution of V2G
β. Output (charge/discharge) request of the battery The data α is an instruction to start or end the execution of V2G. Further, the data β is an output requested to the battery 21 when V2G is executed, that is, a power value to be charged to the battery 21 at the time of charge and a power value to be discharged from the battery 21 at the time of discharge.

Next, the cooling device 31 provided in the electric vehicle 3 will be described with reference to FIGS. 4 and 5. As shown in (a) of FIG. 4, the cooling device 31 includes an engine cooling circuit 40 which cools the engine (not shown), a battery cooling circuit 50 which cools or heats the battery 21, and a charger cooling circuit 60 which cools the bidirectional charger 22, and cooling water serving as a refrigerant is circulated in the respective cooling circuits 40, 50, and 60.

The engine cooling circuit 40 has a first flow path 41 for circulating the cooling water to the engine, a radiator (neither of which is shown), and the like. As shown in (a) of FIG. 4, the first flow path 41 is provided with an electric pump 42, an on-off valve 43, a heater 44, and a heater core 45 for heating the interior of the vehicle. Further, the first flow path 41 is provided with a bypass flow path 46 which bypasses the on-off valve 43. The bypass flow path 46 is provided with a heat exchanger 47 for exchanging heat with a branch flow path 56 (to be described later) of the battery cooling circuit 50. Further, when the electric pump 42 operates, the cooling water circulates in the first flow path 41 in a predetermined direction (for example, the clockwise direction in (a) of FIG. 4).

The battery cooling circuit 50 has a second flow path 51 for circulating the cooling water, and the second flow path 51 is provided with the battery 21, a three-way valve 52, a chiller 53, a four-way valve 54, and an electric pump 55. In the second flow path 51, the branch flow path 56 which branches and returns to itself is provided between the battery 21 and the chiller 53, and the three-way valve 52 is provided at the branch part of the branch flow path 56 and the second flow path 51 on the chiller 53 side. The three-way valve 52 has three ports, and is controlled by the ECU 20 so that two ports are communicated with each other in a predetermined combination. Then, when the branch flow path 56 is connected to the second flow path 51 by the three-way valve 52 so that the refrigerant flows through the branch flow path 56, heat energy can be exchanged between the engine cooling circuit 40 and the battery cooling circuit 50 via the heat exchanger 47. Further, the chiller 53 properly cools the cooling water flowing through the second flow path 51 according to its temperature and the like.

Figure 4:
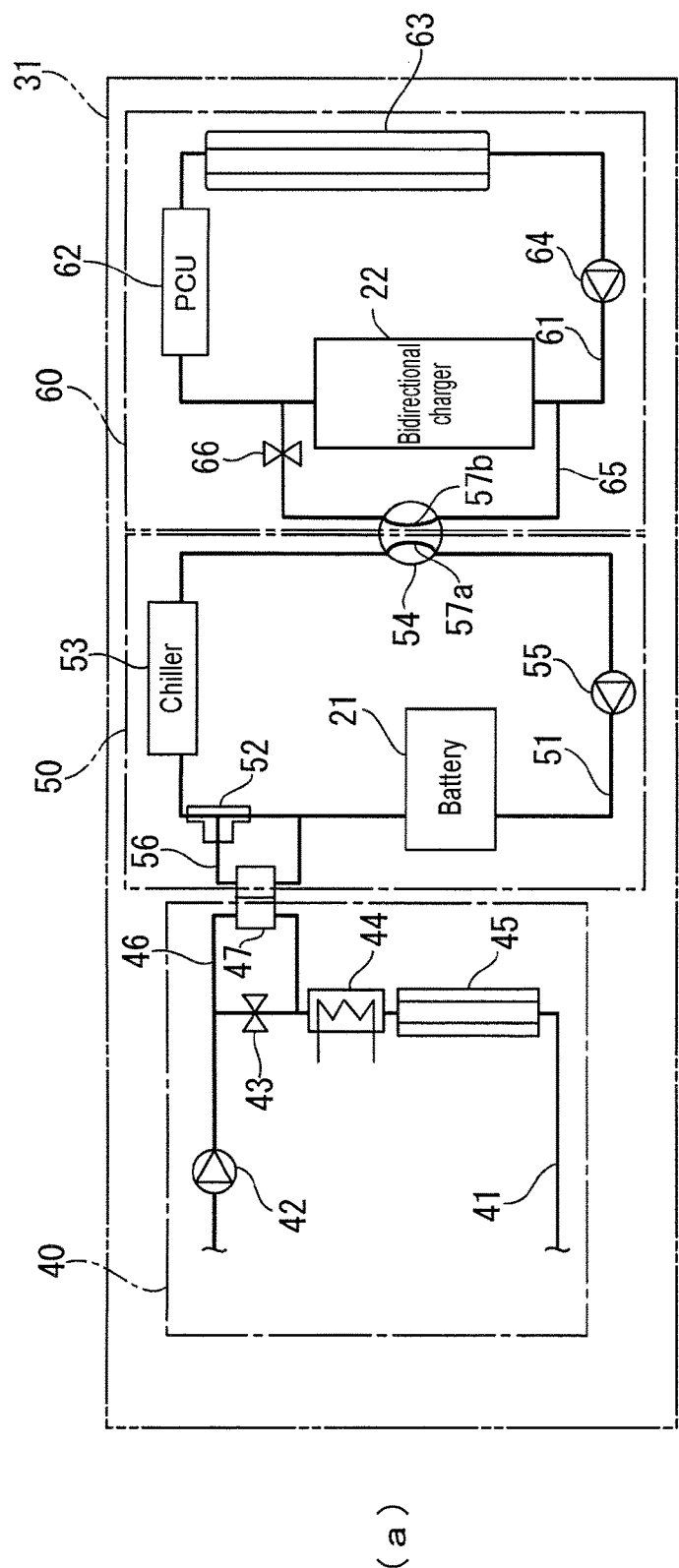
In FIG. 4, (a) is a diagram schematically showing the cooling device mounted on the electric vehicle, and (b) is a diagram showing the four-way valve in an enlarged manner.
Figure 4:
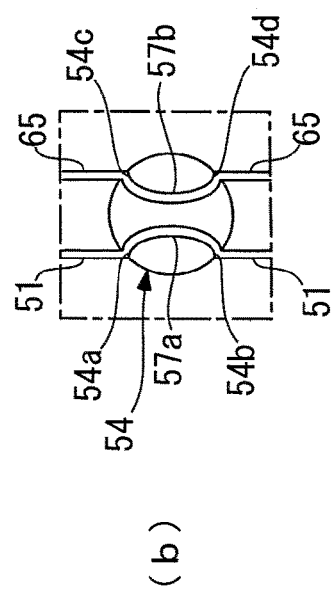

(b) of FIG. 4 shows the four-way valve 54 in an enlarged manner. As shown in the figure, the four-way valve 54 has four ports 54a, 54b, 54c and 54d, and is configured to be controlled by the ECU 20 so that any two ports can communicate with each other. (b) of FIG. 4 shows a state in which the first and second ports 54a and 54b connected to the second flow path 51 of the battery cooling circuit 50 are communicated by a first communication path 57a, and the third and fourth ports 54c and 54d connected to a bypass flow path 65 (to be described later) of the charger cooling circuit 60 are connected by a second communication path 57b. In this case, the battery cooling circuit 50 and the charger cooling circuit 60 are independent cooling circuits. In addition, in the battery cooling circuit 50, when the electric pump 55 operates, the cooling water circulates in the second flow path 51 in a predetermined direction (for example, the clockwise direction in (a) of FIG. 4).

The charger cooling circuit 60 has a third flow path 61 for circulating the cooling water, and the third flow path 61 is provided with the bidirectional charger 22, a pumper control unit (PCU) 62, a radiator 63 and an electric pump 64. The third flow path 61 is provided with the bypass flow path 65 which bypasses the bidirectional charger 22. The bypass flow path 65 is provided with an on-off valve 66, and the third and fourth ports 54c and 54d of the four-way valve 54 are connected to the bypass flow path 65. In addition, in the charger cooling circuit 60, when the electric pump 64 operates, the cooling water circulates in the third flow path 61 in a predetermined direction (for example, the clockwise direction in (a) of FIG. 4).

Figure 5:
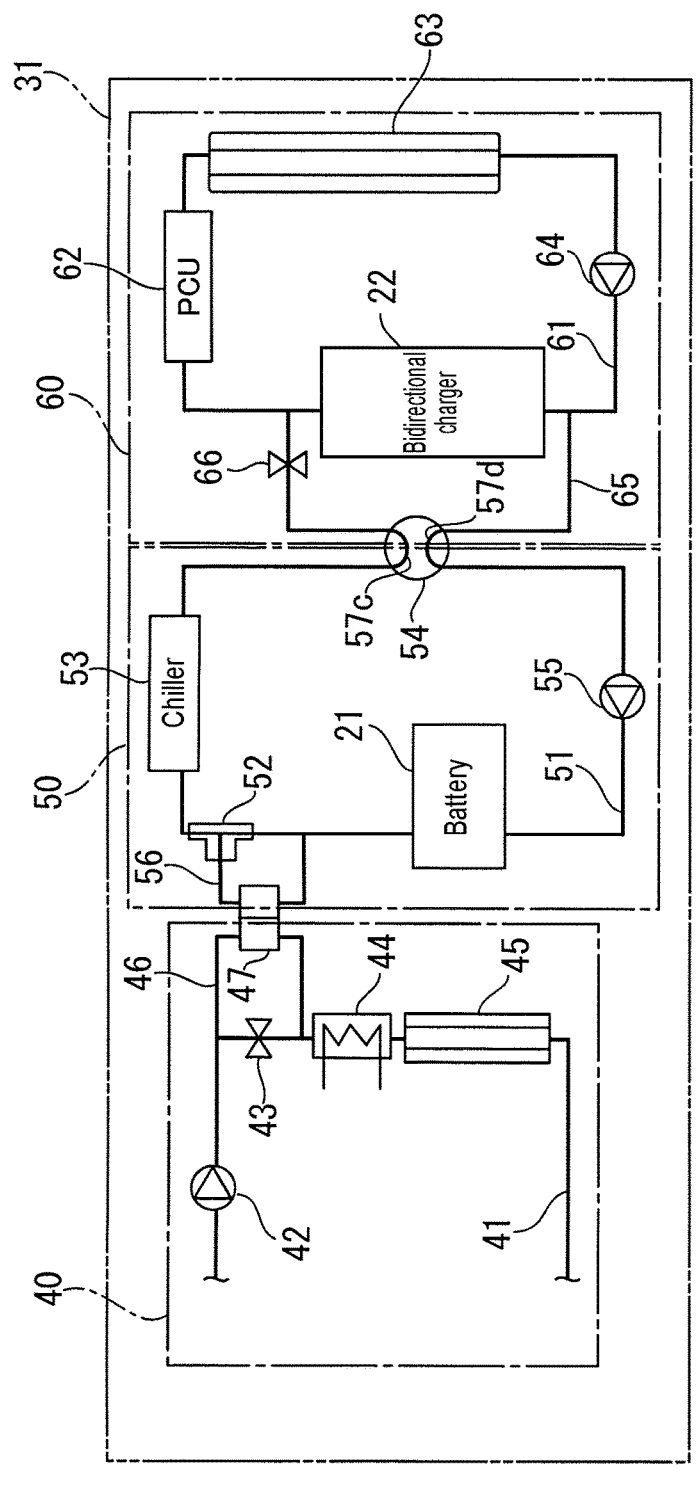
FIG. 5 are diagrams corresponding to FIG. 4 and show a state in which the battery cooling circuit and the charger cooling circuit are connected.
Figure 5:
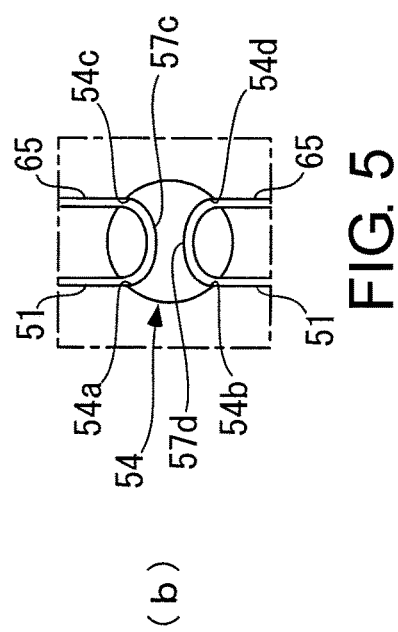

(a) and (b) of FIG. 5 correspond to (a) and (b) of FIG. 4 described above, respectively, and show a state in which the second flow path 51 of the battery cooling circuit 50 and the bypass flow path 65 of the charger cooling circuit 60 are connected by the four-way valve 54. That is, as shown in (b) of FIG. 5, the first and third ports 54a and 54c of the four-way valve 54 are communicated by a third communication path 57c, and the second and fourth ports 54b and 54b of the four-way valve 54 are communicated by a fourth communication path 57d. As a result, as shown in (a) of FIG. 5, the second flow path 51 of the battery cooling circuit 50 and the bypass flow path 65 of the charger cooling circuit 60 are connected to form a single loop flow path.

As shown in FIG. 2, the cooling device 31 described above is provided with a battery temperature sensor 71 which detects the temperature of the battery 21 and a charger temperature sensor 72 which detects the temperature of the bidirectional charger 22, and the detection results thereof are input to the ECU 20. Further, the battery 21 is provided with a battery sensor 73 which detects various information (for example, SOC) of the state of the battery 21, and the detection results thereof are input to the ECU 20. Further, the battery cooling circuit 50 and the charger cooling circuit 60 are provided with water temperature sensors 74 and 75 which detect the temperature of the respective cooling water, and the detection results thereof are input to the ECU 20.

Next, the temperature control of the battery 21 of the electric vehicle 3 participating in V2G will be described. In addition, the user of the electric vehicle 3 connects the connector 13a of the charging stand 13 to the inlet 3a of the electric vehicle 3 and performs a predetermined operation for expressing the intention to participate in V2G, whereby the communication is established between the ECU 20 of the electric vehicle 3 and the aggregator 7 of the power system 2.

Figure 3:
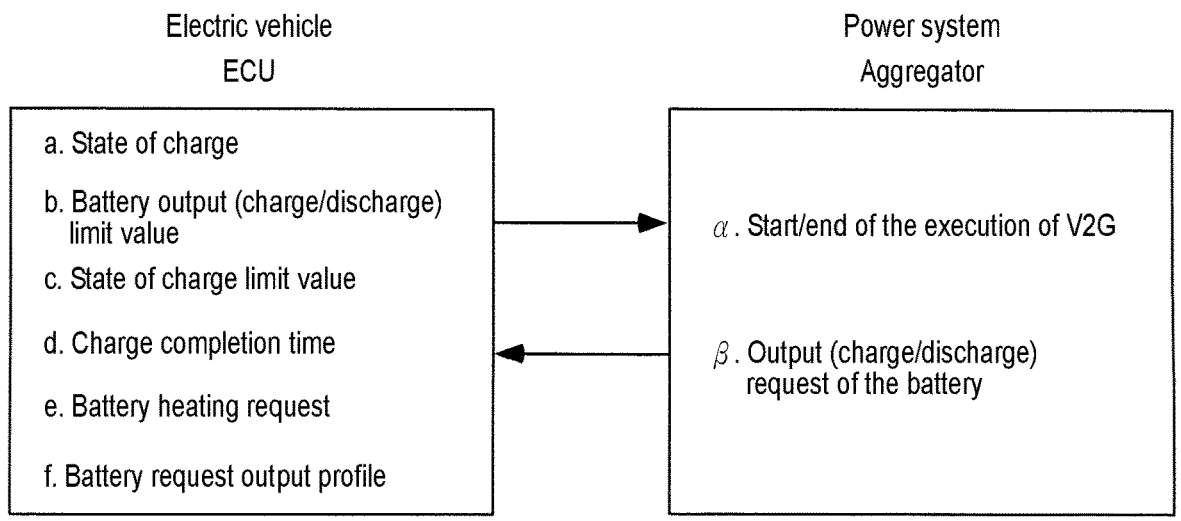
FIG. 3 is a diagram for illustrating data transmitted and received between the ECU of the electric vehicle and the aggregator of the power system.

After the establishment of the communication described above, when the start instruction for the execution of V2G is transmitted from the aggregator 7 to the transmission and reception part 20a of the ECU 20, the data a to d in FIG. 3 described above—that is, the SOC, the battery output limit value, the SOC limit value, and the charge completion time—are transmitted from the ECU 20 that receives the start instruction to the aggregator 7. Further, the data a to d are transmitted to the aggregator 7 at predetermined time intervals until the execution of V2G is completed.

Further, when the temperature of the battery 21 (hereinafter referred to as the "battery temperature TB") is less than the predetermined temperature TBREF (for example, 25° C.) when the transmission and reception part 20a of the ECU 20 receives the start instruction, the data e and f in FIG. 3 described above—that is, the battery heating request and the battery request output profile—are transmitted to the aggregator 7.

Here, the relationship between the battery temperature TB, the output by the battery 21 (hereinafter referred to as the "battery output"), and the output requested by the aggregator 7 to the battery 21 (hereinafter referred to as the "request output") will be described with reference to FIGS. 7 to 9.

Figure 7:
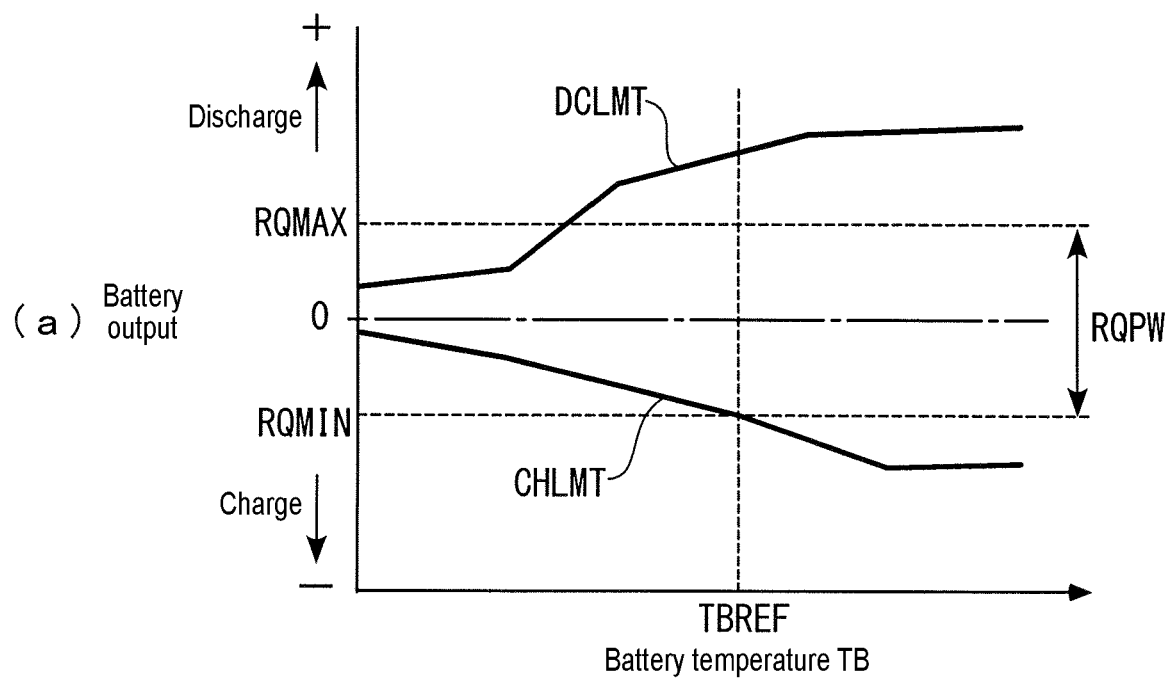
FIG. 7 are illustration diagrams for illustrating the relationship between the battery temperature, the battery output limit value (the discharge limit DCLMT and the charge limit CHLMT), and the upper limit value and the lower limit value (the maximum request output RQMAX and the minimum request output RQMIN) of the request output to the battery.
Figure 7:
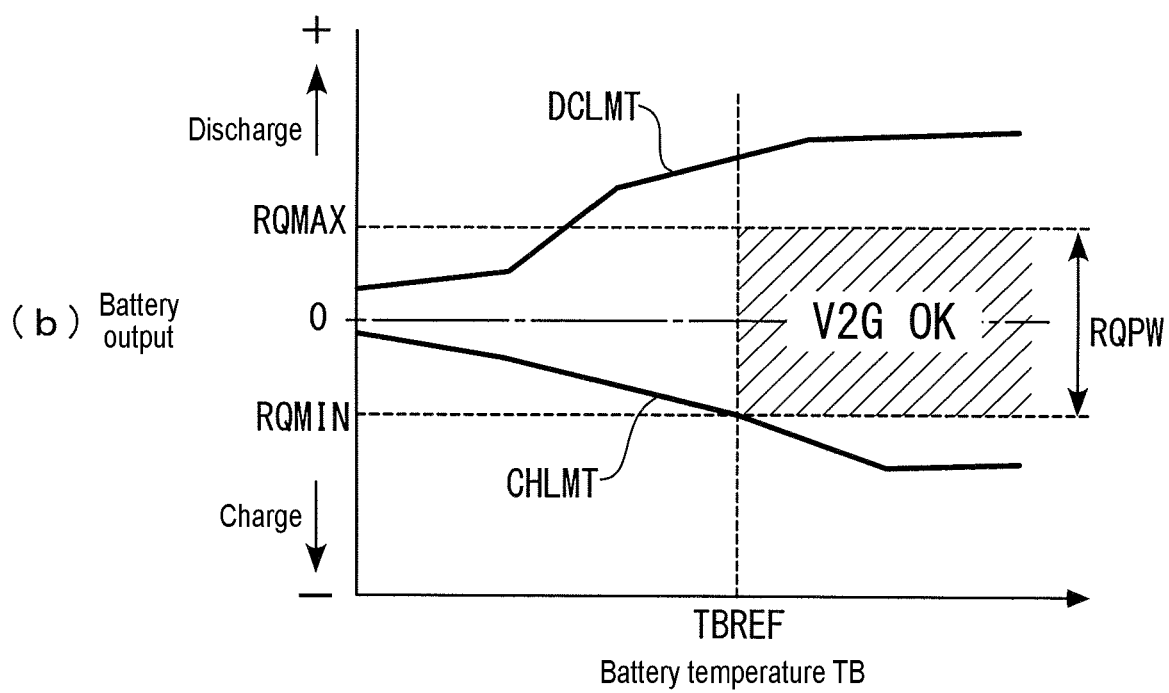

(a) of FIG. 7 shows the relationship between the battery temperature TB and the battery output limit value. In the figure, the case where the value of the battery output is positive indicates discharge, which is output from the battery 21, and the case where the value of the battery output is negative indicates output to the battery 21, that is, charge. As shown in the figure, both the discharge limit DCLMT, which is the dischargeable limit value of the battery 21, and the charge limit CHLMT, which is the chargeable limit value of the battery 21, increase as the battery temperature TB increases. That is, the higher the battery temperature TB is, the larger the power for which the battery 21 can be discharged and charged is.

Further, (a) of FIG. 7 also shows the maximum value (hereinafter referred to as the "maximum request output RQMAX") and the minimum value (hereinafter referred to as the "minimum request output RQMIN") of the request output from the aggregator 7 to the battery 21. That is, the aggregator 7 requests the battery 21 to output by charging and discharging with a request output width RQPW between the maximum request output RQMAX and the minimum request output RQMIN.

Further, (a) of FIG. 7 shows the predetermined temperature TBREF, and when the battery temperature TB is greater than or equal to the predetermined temperature TBREF, the discharge limit DCLMT is greater than the maximum request output RQMAX. That is, in this case, the battery 21 is capable of responding to any request output for discharging. Further, when the battery temperature TB is greater than or equal to the predetermined temperature TBREF, the charge limit CHLMT is less than the minimum request output RQMIN. That is, in this case, the battery 21 is capable of responding to any request output for charging. Therefore, as shown in (b) of FIG. 7, when the battery temperature TB of the battery 21 is greater than or equal to the predetermined temperature TBREF, it is possible to respond to any request output for charging and discharging from the aggregator 7.

Further, when the battery temperature TB of the battery 21 is less than the predetermined temperature TBREF, as shown in FIG. 7, the minimum request output RQMIN is less than the charge limit CHLMT, and the maximum request output RQMAX is greater than the discharge limit DCLMT. In these cases, if the battery 21 tries to accept the request output for charging and discharging from the aggregator 7 as it is, the battery output may exceed the charge limit CHLMT or the discharge limit DCLMT.

Figure 8:
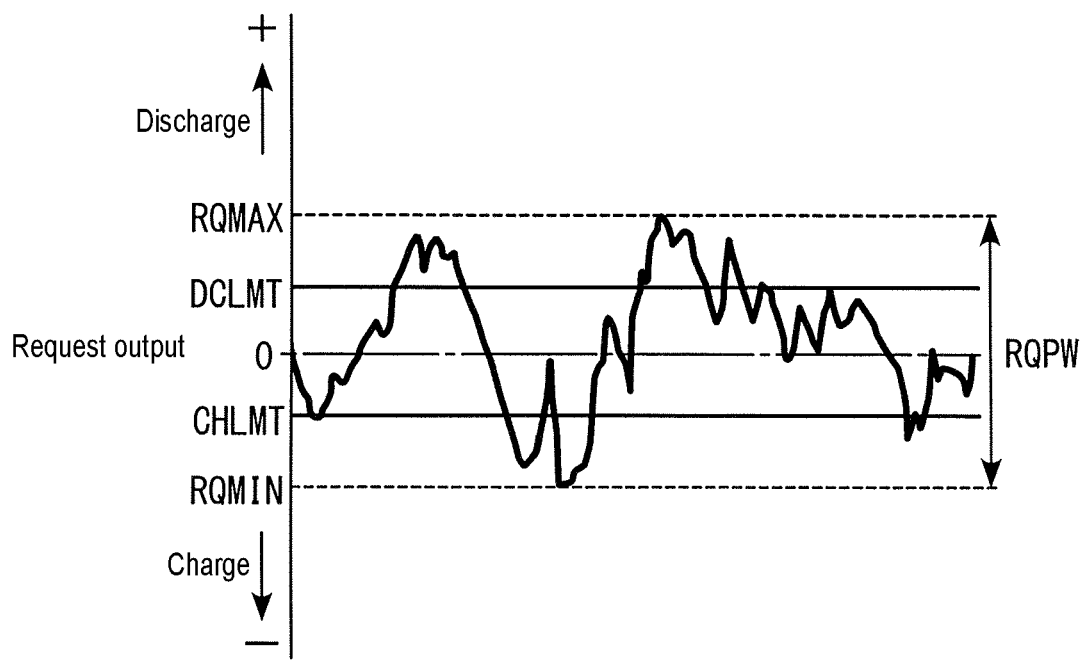
FIG. 8 is an illustration diagram for illustrating a state in which the request output to the battery is performed exceeding the battery output limit value.

FIG. 8 shows an example of the elapse including a case where the request output from the aggregator 7 for charging and discharging exceeds the discharge limit DCLMT and the charge limit CHLMT. As shown in the figure, when there is a request output exceeding the discharge limit DCLMT or the charge limit CHLMT and the battery 21 tries to respond to the request output, the battery 21 may malfunction.

Therefore, in the embodiment, the above-mentioned data b in FIG. 3 (that is, the above-mentioned charge limit CHLMT and discharge limit DCLMT serving as the battery output limit value) and the data f in FIG. 3 (that is, the charge and discharge waveform data and the duty ratio serving as the request output profile of the battery 21) are transmitted to the aggregator 7, and the aggregator 7 requests the ECU 20 of the output of the battery 21 by charging and discharging according thereto. That is, the aggregator 7 issues a request output to the ECU 20 for the battery 21 to charge and discharge without exceeding the received charge limit CHLMT and discharge limit DCLMT. FIG. 9 shows an example of the elapse of the request output in the case described above.

Figure 9:
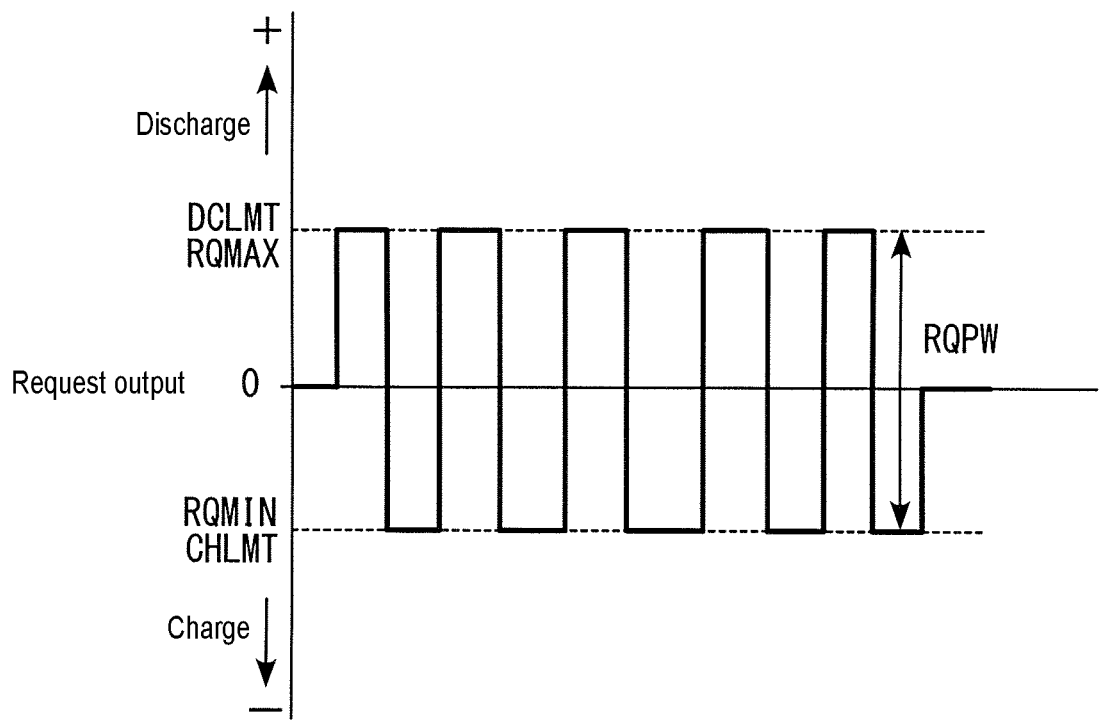
FIG. 9 is an illustration diagram for illustrating a state in which the request output to the battery is performed within the battery output limit value.

In FIG. 9, in the request output for the battery 21, the maximum request output RQMAX at the time of discharge is less than or equal to the discharge limit DCLMT, and the minimum request output RQMIN at the time of charge is greater than or equal to the charge limit CHLMT. Therefore, in this case, since the request output does not exceed the discharge limit DCLMT and the charge limit CHLMT, V2G can be executed even when the battery temperature TB is less than the predetermined temperature TBREF.

Next, the switching control of the four-way valve 54 in the cooling device 31 of the electric vehicle 3 will be described with reference to FIG. 6. After the V2G start instruction is received by the transmission and reception part 20a of the ECU 20, the four-way valve 54 is controlled by the ECU 20 as follows. Further, this switching control is repeatedly executed at predetermined time intervals.

Figure 6:
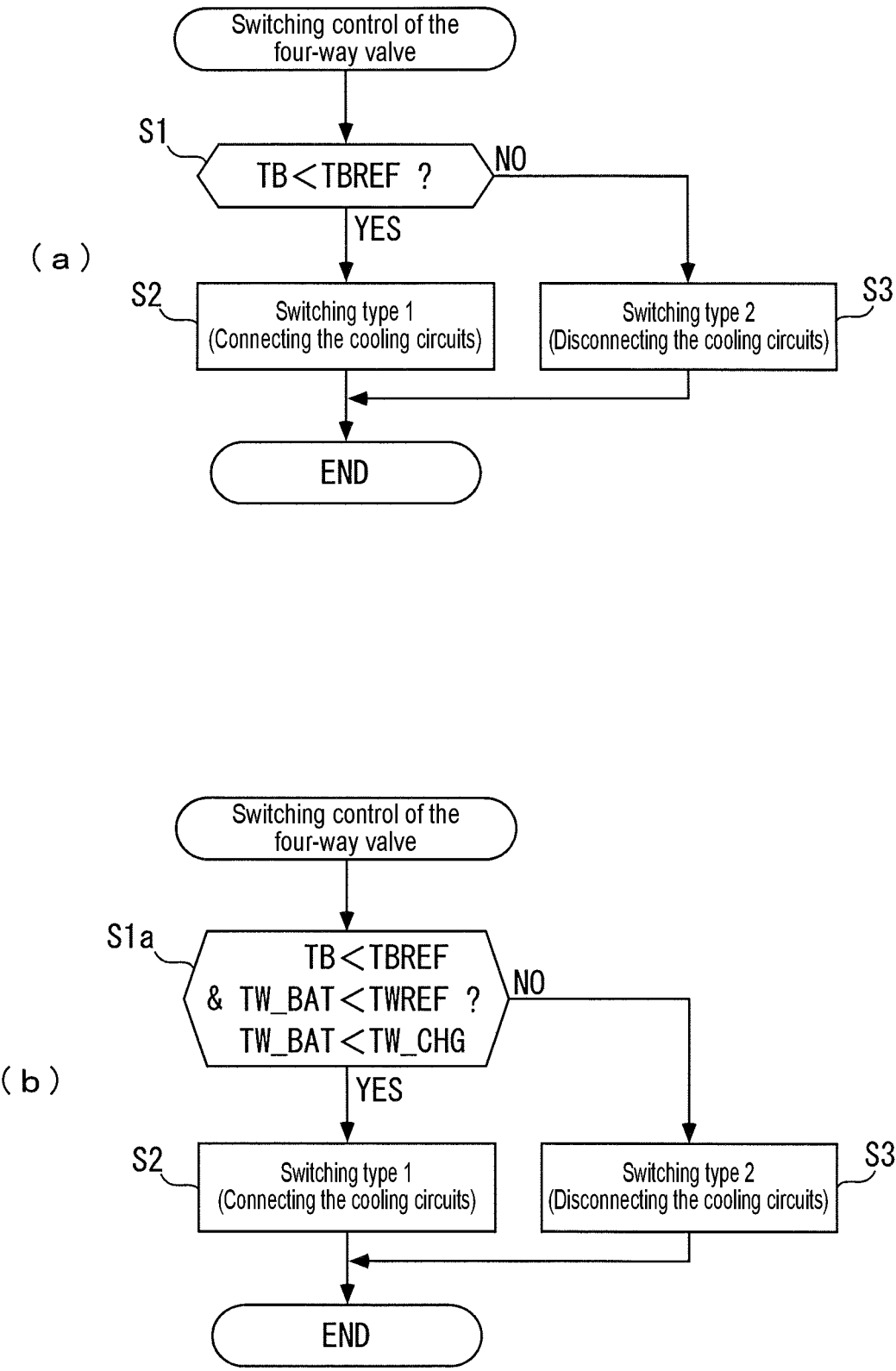
FIG. 6 are flowcharts showing the switching control of the four-way valve.

As shown in (a) of FIG. 6, in this switching control, in Step 1 (denoted as "51" in the figure), it is determined whether the battery temperature TB detected by the battery temperature sensor 71 is less than the predetermined temperature TBREF. When the determination result is YES, the four-way valve 54 is switched to the switching type 1 (Step S2), and this switching control ends. That is, the four-way valve 54 is switched to the state shown in FIG. 5 described above, and the second flow path 51 of the battery cooling circuit 50 and the bypass flow path 65 of the charger cooling circuit 60 are connected.

Further, in this case, the electric pump 55 of the battery cooling circuit 50 is operated, while the electric pump 64 of the charger cooling circuit 60 is stopped and the on-off valve 66 is opened. As a result, the second flow path 51 of the battery cooling circuit 50 and the bypass flow path 65 of the charger cooling circuit 60 form a single loop, and the cooling water circulates in the single loop in the clockwise direction in (a) of FIG. 5. In this way, the heat energy due to the heat generated by the bidirectional charger 22 is supplied to the battery cooling circuit 50 side via the cooling water, and the temperature of the battery 21 can be further raised.

On the other hand, when the determination result in Step 1 of (a) of FIG. 6 is NO and the battery temperature TB is greater than or equal to the predetermined temperature TBREF, it is assumed that the supply of heat energy on the charger cooling circuit 60 side to the battery 21 is unnecessary, and the four-way valve 54 is switched to the switching type 2 (Step S3), and this switching control ends. That is, the four-way valve 54 is switched to the state shown in FIG. 4 described above, and the connection of the second flow path 51 of the battery cooling circuit 50 and the bypass flow path 65 of the charger cooling circuit 60 is disconnected. As a result, the battery cooling circuit 50 and the charger cooling circuit 60 become independent cooling circuits, and the battery 21 and the bidirectional charger 22 can be cooled in a temperature range suitable for each.

Further, it is also possible to add temperature conditions of the cooling water of the battery cooling circuit 50 and the charger cooling circuit 60 in Step S1 of the switching control of (a) of FIG. 6 described above. Specifically, as shown in (b) of FIG. 6, in Step S1a corresponding to the Step S1 described above, in addition to the above-mentioned relationship (TB<TBREF) between the battery temperature TB and the predetermined temperature TBREF, that the cooling water temperature TW_BAT of the battery cooling circuit 50 is less than a predetermined water temperature TWREF (for example, 40° C.) (TW_BAT<TWREF) and that the cooling water temperature TW_BAT is less than the cooling water temperature TW_CHG of the charger cooling circuit 60 (TW_BAT<TW_CHG) are further added. By adding such temperature conditions of the cooling water, it is possible to reliably supply high heat energy from the charger cooling circuit 60 side to the battery cooling circuit 50 side, and it is possible to suppress the excessive temperature rise of the battery 21.

Further, during the execution of V2G, just before charge for fully charging the battery 21 of the electric vehicle 3 is started, the aggregator 7 transmits an end instruction of V2G, and the instruction is received by the ECU 20. As a result, V2G by the battery 21 of the electric vehicle 3 and the power system 2 ends.

As described in detail above, according to the embodiment, the charge and discharge of the battery 21 is started when the aggregator 7 transmits the start instruction for the execution of V2G to the ECU 20 of the electric vehicle 3 participating in V2G. In this case, when the electric vehicle 3 is in a low temperature environment and the battery temperature TB is less than the predetermined temperature TBREF, the second flow path 51 of the battery cooling circuit 50 and the bypass flow path 65 of the charger cooling circuit 60 are connected via the four-way valve 54. As a result, the high-temperature cooling water flowing through the bypass flow path 65 can flow into the second flow path 51. Therefore, according to the embodiment, the battery 21 of the electric vehicle 3 can be efficiently heated while executing V2G in a low temperature environment.

Further, by adopting the four-way valve 54 for connecting the second flow path 51 of the battery cooling circuit 50 and the bypass flow path 65 of the charger cooling circuit 60, the connection and disconnection of the battery cooling circuit 50 and the charger cooling circuit 60 can be easily performed.

Further, the disclosure is not limited to the above-described embodiments, and can be implemented in various embodiments. For example, in the embodiment, the plug-in hybrid vehicle is exemplified as the electric vehicle 3, but the disclosure is not limited thereto, and other electric vehicles such as electric automobiles are also applicable as long as they can participate in V2G.

Further, the detailed configurations of the cooling device 31, the engine cooling circuit 40, the battery cooling circuit 50, the charger cooling circuit 60, and the four-way valve 54 shown in the embodiments are merely examples, and can be changed as appropriate within the scope of the disclosure.

What is claimed is:

1. A battery temperature control device of an electric vehicle for controlling the temperature of a battery of the electric vehicle, wherein the electric vehicle participates in vehicle to grid (V2G) which allows bidirectional power exchange between the battery for vehicle driving mounted on the electric vehicle and a power system, the battery temperature control device comprising:
    a battery cooling circuit for cooling or heating the battery by circulating a refrigerant;
    a power converter cooling circuit for cooling a power converter which converts power between the battery and the power system by circulating a refrigerant;
    a cooling circuit connection part which is capable of connecting the battery cooling circuit and the power converter cooling circuit;
    a battery temperature detection part which detects the temperature of the battery;
    a vehicle side control part which is provided in the electric vehicle, which controls the cooling circuit connection part and charge and discharge of the battery, and which is capable of transmitting and receiving information about the battery; and
    a power system side battery charge and discharge management part which is provided in the power system, which is configured to be capable of transmitting and receiving information about the battery to and from the vehicle side control part, and which manages the charge and discharge of the battery,
    wherein when the power system side battery charge and discharge management part starts execution of V2G by transmitting to the vehicle side control part a start instruction for the charge and discharge of the battery, the vehicle side control part controls the cooling circuit connection part to connect the battery cooling circuit and the power converter cooling circuit when the detected temperature of the battery is less than a predetermined temperature.

2. The battery temperature control device of the electric vehicle according to claim 1, wherein when the detected temperature of the battery is less than the predetermined temperature, the vehicle side control part transmits to the power system side battery charge and discharge management part a heating request indicating that the battery is in a state to be heated and transmits an output limit value at the time of the charge and discharge of the battery, and when receiving the heating request, the power system side battery charge and discharge management part issues to the vehicle side control part an output request for the battery to charge and discharge according to the received output limit value without exceeding the output limit value.

3. The battery temperature control device of the electric vehicle according to claim 2, wherein the vehicle side control part transmits to the power system side battery charge and discharge management part a predetermined output profile for the battery, and the power system side battery charge and discharge management part issues to the vehicle side control part an output request for the battery to charge and discharge according to the received output profile.

4. The battery temperature control device of the electric vehicle according to claim 3, wherein the vehicle side control part controls the cooling circuit connection part to disconnect the battery cooling circuit and the power converter cooling circuit when the detected temperature of the battery is greater than or equal to the predetermined temperature.

5. The battery temperature control device of the electric vehicle according to claim 4, wherein the cooling circuit connection part comprises a four-way valve having four ports through which the refrigerant is capable of flowing in and out and configured to allow any two of the four ports to communicate with each other, and the battery cooling circuit is connected to two of the four ports, and the power converter cooling circuit is connected to the other two ports.

6. The battery temperature control device of the electric vehicle according to claim 3, wherein the cooling circuit connection part comprises a four-way valve having four ports through which the refrigerant is capable of flowing in and out and configured to allow any two of the four ports to communicate with each other, and the battery cooling circuit is connected to two of the four ports, and the power converter cooling circuit is connected to the other two ports.

7. The battery temperature control device of the electric vehicle according to claim 2, wherein the vehicle side control part controls the cooling circuit connection part to disconnect the battery cooling circuit and the power converter cooling circuit when the detected temperature of the battery is greater than or equal to the predetermined temperature.

8. The battery temperature control device of the electric vehicle according to claim 7, wherein the cooling circuit connection part comprises a four-way valve having four ports through which the refrigerant is capable of flowing in and out and configured to allow any two of the four ports to communicate with each other, and the battery cooling circuit is connected to two of the four ports, and the power converter cooling circuit is connected to the other two ports.

9. The battery temperature control device of the electric vehicle according to claim 2, wherein the cooling circuit connection part comprises a four-way valve having four ports through which the refrigerant is capable of flowing in and out and configured to allow any two of the four ports to communicate with each other, and the battery cooling circuit is connected to two of the four ports, and the power converter cooling circuit is connected to the other two ports.

10. The battery temperature control device of the electric vehicle according to claim 1, wherein the vehicle side control part transmits to the power system side battery charge and discharge management part a predetermined output profile for the battery, and the power system side battery charge and discharge management part issues to the vehicle side control part an output request for the battery to charge and discharge according to the received output profile.

11. The battery temperature control device of the electric vehicle according to claim 10, wherein the cooling circuit connection part comprises a four-way valve having four ports through which the refrigerant is capable of flowing in and out and configured to allow any two of the four ports to communicate with each other, and the battery cooling circuit is connected to two of the four ports, and the power converter cooling circuit is connected to the other two ports.

12. The battery temperature control device of the electric vehicle according to claim 10, wherein the vehicle side control part controls the cooling circuit connection part to disconnect the battery cooling circuit and the power converter cooling circuit when the detected temperature of the battery is greater than or equal to the predetermined temperature.

13. The battery temperature control device of the electric vehicle according to claim 12, wherein the cooling circuit connection part comprises a four-way valve having four ports through which the refrigerant is capable of flowing in and out and configured to allow any two of the four ports to communicate with each other, and the battery cooling circuit is connected to two of the four ports, and the power converter cooling circuit is connected to the other two ports.

14. The battery temperature control device of the electric vehicle according to claim 1, wherein the vehicle side control part controls the cooling circuit connection part to disconnect the battery cooling circuit and the power converter cooling circuit when the detected temperature of the battery is greater than or equal to the predetermined temperature.

15. The battery temperature control device of the electric vehicle according to claim 14, wherein the cooling circuit connection part comprises a four-way valve having four ports through which the refrigerant is capable of flowing in and out and configured to allow any two of the four ports to communicate with each other, and the battery cooling circuit is connected to two of the four ports, and the power converter cooling circuit is connected to the other two ports.

16. The battery temperature control device of the electric vehicle according to claim 1, wherein the cooling circuit connection part comprises a four-way valve having four ports through which the refrigerant is capable of flowing in and out and configured to allow any two of the four ports to communicate with each other, and the battery cooling circuit is connected to two of the four ports, and the power converter cooling circuit is connected to the other two ports.

* * * * *